(12) United States Patent
Lachwani et al.

(10) Patent No.: US 8,766,919 B1
(45) Date of Patent: Jul. 1, 2014

(54) FAST AWAKE FROM LOW POWER MODE

(76) Inventors: Manish Lachwani, Sunnyvale, CA (US); Jay Michael Puckett, Cupertino, CA (US); David Berbessou, Sunnyvale, CA (US); James Samuel Bowen, Cupertino, CA (US); David J. Isbister, San Francisco, CA (US)

( * ) Notice: Subject to any disclaimer, the term of this patent is extended or adjusted under 35 U.S.C. 154(b) by 888 days.

(21) Appl. No.: 12/716,007

(22) Filed: Mar. 2, 2010

(51) Int. Cl.
*G06F 3/02* (2006.01)
*G09G 5/00* (2006.01)

(52) U.S. Cl.
USPC ............................ 345/168; 345/169; 713/323

(58) Field of Classification Search
USPC .......... 345/1.1, 685, 107, 153–174, 633, 690; 40/124.01; 715/700; 713/323, 300, 1, 713/182, 2, 502
See application file for complete search history.

(56) References Cited

U.S. PATENT DOCUMENTS

| | | | |
|---|---|---|---|
| 2009/0231233 A1* | 9/2009 | Liberatore | 345/1.3 |
| 2010/0115022 A1* | 5/2010 | Rapo | 709/203 |
| 2010/0325457 A1* | 12/2010 | Lachwani et al. | 713/323 |

* cited by examiner

*Primary Examiner* — Kevin M Nguyen
*Assistant Examiner* — Kenneth B Lee, Jr.
(74) *Attorney, Agent, or Firm* — Lee & Hayes, PLLC

(57) ABSTRACT

An electronic device in a low power mode, for example an eBook reader device, may use a fast awake module to quickly update a display. The electronic device may receive an interrupt, begin to awaken, present a cached pre-rendered image on the display, and may resume the low power mode or pre-render additional images to refill the cache before resuming the low power mode.

20 Claims, 7 Drawing Sheets

FAST AWAKE FROM LOW POWER MODE

BACKGROUND

Electronic devices, such as electronic book readers ("eBook reader devices"), cellular telephones, portable media players, desktop computers, laptops, tablet computers, netbooks, personal digital assistants, and the like, rely on electrical power to function.

Within these electronic devices, several components utilize significant amounts of power during operation, including the processor(s) and peripheral devices. These peripheral devices include external memory interfaces (EMIs), Universal Serial Bus (USB) controllers, image processing units (IPUs), and so forth. These peripheral devices may reside on the same "chip" or die as the processor and/or may reside on another die.

A peripheral device that is not actively in use but is idling continues to consume significant quantities of power. This idling wastes energy and increases the amount of heat dissipated by the electronic device. Conversely, reducing power consumption increases the usable time for a portable device operating from a battery. Reducing power consumption also reduces the heat dissipated by the electronic device, allowing it to operate at a cooler temperature and thus increasing the life of the equipment and simplifying cooling design.

Various schemes have been put forth to reduce power consumption in portable consumer devices by placing the processor and the peripherals into lower power modes. Typically, this involves turning off unused portions of the circuit and/or reducing a clock speed of the microprocessor.

However, these techniques often introduce undesirable latencies to execution of commands upon resumption of normal activity, particularly with regard to providing an updated image to a display.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
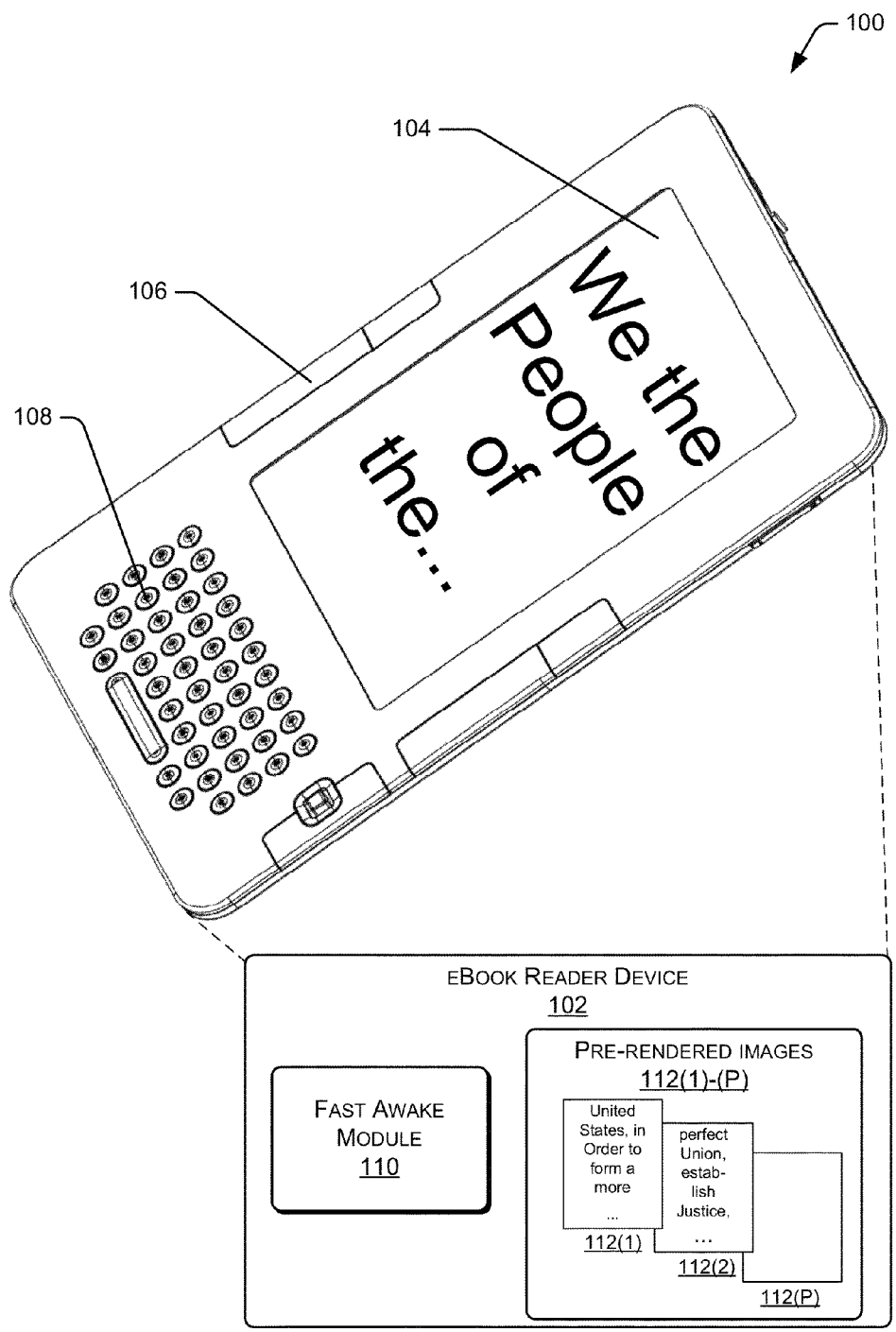
FIG. 1 is an illustrative eBook reader device configured with a fast awake module for rapidly rendering content while also leveraging a low power mode of the device to conserve battery power.

As described above, electronic devices utilize low power modes to reduce power consumption and heat dissipation. The electronic devices may be electronic book readers ("eBook reader devices"), cellular telephones, portable media players, desktop computers, laptops, tablet computers, netbooks, personal digital assistants, and the like. These devices may provide the ability to access content via a network connection. For example, an eBook reader device may have a wireless network connection to allow convenient access to content stored elsewhere and accessible by the network connection. Reduction in energy requirements by devices is pursued, both to reduce overall energy usage, such as in desktops, but also to extend the usable time of battery-powered devices such as eBook reader devices and other handheld electronic devices. One approach is to place the devices into a lower power mode.

However, existing strategies require fully awakening a device and calling upon a rendering module to refresh a screen, such as after a user presses a page turn button on an eBook reader device. This leads to delays in rendering the next screen of desired content, as well as consuming power to completely restart all applications.

This discussion describes techniques for storing pre-rendered images of a display in memory, and using a fast awake module to display these images in response to a keypad interrupt or other pre-determined inputs.

An image anticipated for presentation, such as a next page in eBook content, may be pre-rendered while the device is active and cached in memory. When a button on a keypad is activated while the electronic device is in a low power mode, a keypad wakeup interrupt is generated. This keypad wakeup interrupt awakens the electronic device from the low power mode and results in a call to a fast awake module. The fast awake module presents the pre-rendered image which has been cached on a display device. For example, this pre-rendered image may be the next page in an eBook. The electronic device may continue its restart and may refill the cache with a subsequent page. In some implementations, when pre-rendered images remain in the cache, the electronic device may resume the low power mode and may refill the cache at a later time.

These techniques may be implemented by an electronic device utilizing a processor capable of entering a low power mode. For example, the i.MX architecture from Freescale™ Semiconductor Incorporated, of Austin, Tex., United States of America, is one suitable family of processors.

The processor executes an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks®.

For example, an eBook reader device may incorporate a Freescale™ processor having an i.MX architecture and executing a Linux® kernel. The kernel uses device drivers to communicate with peripheral devices such as external memory interfaces (EMIs), Universal Serial Bus (USB) controllers, image processing units (IPUs), and so forth. These peripheral devices may reside on the same "chip" or die as the processor as in the case of the i.MX architecture and/or may reside on another die.

By improving response time to a user and minimizing delay with the fast awake module, the electronic device may thus spend more time in a low power mode. By increasing the amount of time spent in low power mode, power consumption is reduced. This results in increased usable times for a given amount of power available, such as the capacity available in a battery. Furthermore, this reduction in time at full power may also extend the operational life of the device or subcomponents thereof.

The low power mode may, but need not necessarily, comprise a doze mode, such as the doze mode discussed in pending U.S. patent application Ser. No. 12/261,980 filed Oct. 30, 2008 and entitled "Low Power Mode for Processor."

While this overview is described in terms of an eBook reader device, the concepts described herein may also be applicable to cellular telephones, portable media players, desktop computers, laptops, tablet computers, netbooks, personal digital assistants, or other electronic devices.

Illustrative eBook Reader Device

FIG. 1 is an illustrative electronic device 100 such as an eBook reader device 102 configured to implement a fast awake module. While this figure illustrates an eBook reader device for example purposes, other implementations may employ any other type of electronic device, as discussed above. As illustrated, the eBook reader device includes a display 104, and a keypad which may include one or more page turning buttons 106 and a keyboard 108 for user input. Furthermore, the keypad may include any other controls configured to receive any other sort of user input via buttons, touch screen inputs, or the like. EBook reader device 102 may utilize a fast awake module 110 with pre-rendered images 112(1), 112(2), 112(P). As used in this application, letters within parenthesis such as "(P)" indicate an integer number greater than zero. As described in more detail below with regards to FIGS. 2-7, the fast awake module 110 is configured to use one or more pre-rendered images 112(1)-(P) to provide a quick change of content presented on eBook reader device 102 while reducing a power load on the device entering a low power mode. While the examples given herein discuss pre-rendered images, other content may be pre-rendered as well. For example, a portion of an audio or video clip may be pre-rendered and stored.

Figure 2:
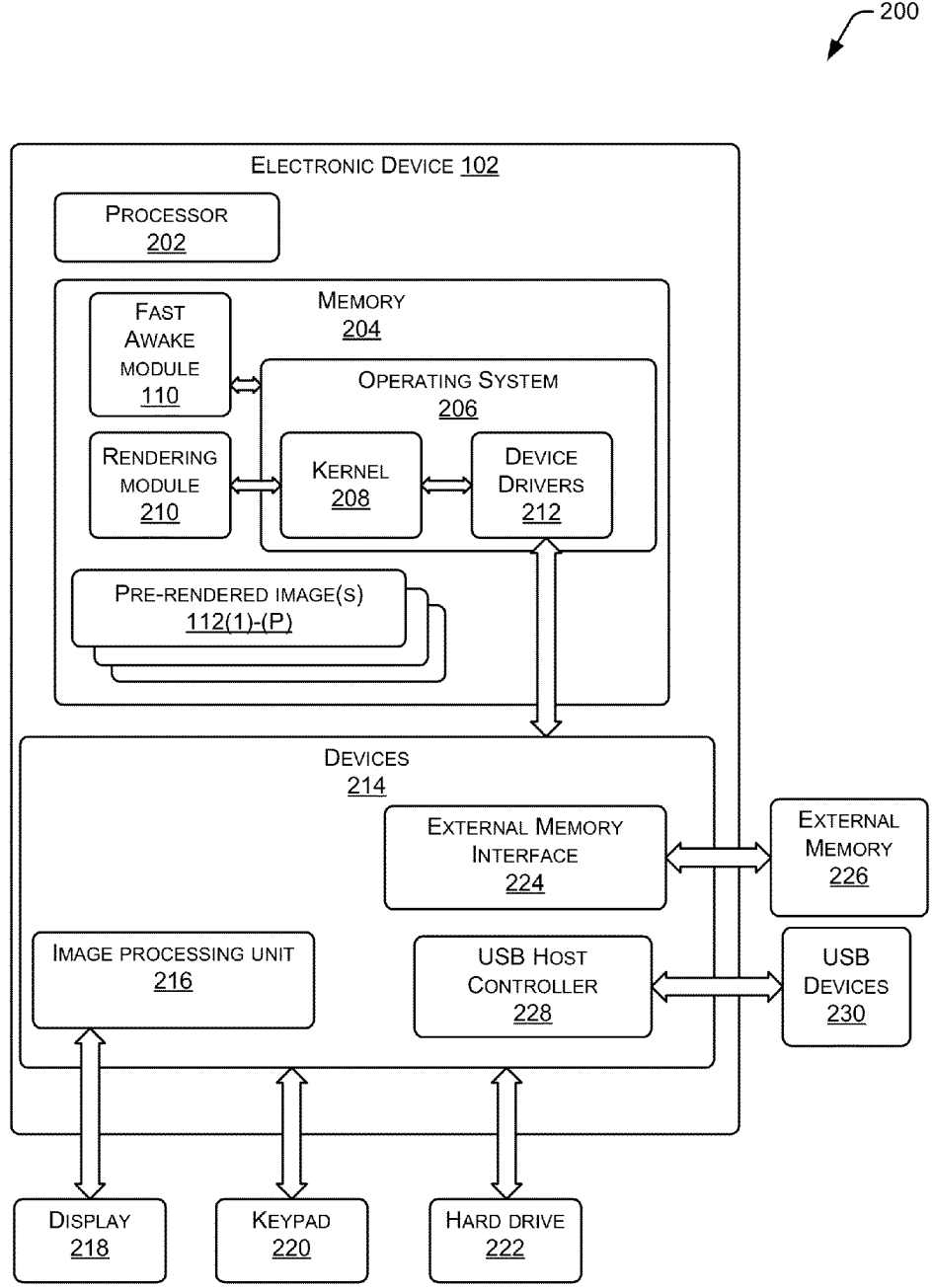
FIG. 2 is an illustrative schematic of an electronic device configured to use the fast awake module of FIG. 1.

FIG. 2 is an illustrative schematic 200 of the eBook reader device 102 shown in FIG. 1. A central processor unit ("processor") 202 is shown within eBook reader device 102. Memory 204 within the eBook reader device 102 may store an operating system 206 comprising a kernel 208. Furthermore, memory 204 may also store fast awake module 110 and a rendering module 210 that is coupled to kernel 208.

Fast awake module 110 is configured to perform specific acts upon detection of a pre-determined interrupt, such as a keypad wakeup interrupt. Upon detecting the pre-determined interrupt, the fast awake module 110 may take a pre-determined action such as presenting a cached pre-rendered image on a display.

Rendering module 210 is configured to take content from an eBook, a picture, and so forth, and render them for presentation on a display 218. Rendering module 210 may work in conjunction with image processing unit 216 as described below to present the image on the display 218. The term "page," as used herein, refers to a collection of content that is presented at one time in a display of the eBook reader device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display.

Rendering module 210 may also be configured to generate pre-rendered images 112(1)-(P) which may then be stored in memory 204. For example, these pre-rendered images may be renderings of pages in an eBook following that which is currently presented on the display 218. In other implementations, the pre-rendered images may comprise a portion of a video stream.

Kernel 208 may operatively couple to one or more device drivers 212 that are stored in memory 204. These device drivers may include a display driver, external memory interface driver, USB host controller driver, and so forth. Device drivers 212 are operatively coupled to devices 214. Several illustrative devices in eBook reader device 102 are described next.

An image processing unit 216 is shown coupled to a display 218. For example, display 218 may be display 104 on eBook reader device 102 described above with reference to FIG. 1. Image processing unit 216 may be configured to, at the direction of processor 202, take input data and generate an image suitable for presentation on a display 218. For example, the text data of an eBook may be converted into a bitmap of the page suitable for presentation on the display 218.

The display 218 is capable of presenting an image while the processor 202 is in a low power mode or off. Displays which present an image without applied power, such as electrophoretic displays, cholesteric liquid crystal displays, electrofluidic displays, and so forth may be used. In some implementations, displays which do not present an image without applied power, such as an organic light emitting diode ("OLED") display, may be configured to enter a self-refresh mode allowing the display to remain active and presenting content while the processor 202 is in the low power mode or off.

In some implementations the image processing unit 216 may be coupled to dedicated graphic memory. In such implementations, the pre-rendered images 112(1)-(P) may be stored at least in part in the dedicated graphic memory. Furthermore, in such implementations the image processing unit 216 and dedicated graphic memory may be selectively awoken from a low power mode, while leaving the processor 202 and other devices in the low power mode. Upon selectively awakening the image processing unit 216 and the dedicated graphic memory, the cached pre-rendered image may be sent to the display for presentation.

EBook reader device 102 may have a keypad 220 coupled thereto. For example, this may be the keypad of eBook reader device 102 described above, which incorporates page turn buttons 106 and keyboard 108. When the eBook reader device 102 is in a low power mode, activation of a key on the keypad will generate a keypad wakeup interrupt. This keypad wakeup interrupt may be used to initiate the fast awake module 110.

Also shown is hard drive 222, which may use magnetic or optical memory on spinning disks or solid state storage. This hard drive 222 may be used to store content for consumption by the user, such as electronic books.

An External Memory Interface ("EMI") 224 may be present. EMI 224 may be coupled to external memory 226, which may comprise Static Random Access Memory ("SRAM"), Pseudostatic Random Access Memory ("PSRAM"), Synchronous Dynamic Random Access Memory ("SDRAM"), Double Data Rate SDRAM ("DDR"), NAND Flash, and so forth. In some implementations, at least a portion of pre-rendered images 112(1)-(P) may be stored in external memory 226. When volatile external memory 226 such as SDRAM is used to store the pre-rendered images 112(1)-(P), pages in the SDRAM may be reserved for a display driver or for the OS 206. The SDRAM may then be placed into self-refresh mode while the remainder of the device is in a state retention mode, allowing for the contents of the SDRAM to persist across the low power/awake cycles.

A USB controller device 228 is shown, and may be coupled to USB devices 230, for example a wireless wide area network modem. The controller device may comply with any of the USB standards including USB 1.0, 1.1, 2.0, 3.0 as set forth by the USB Implementers Forum.

Electronic book reader device 102 may further include one or more other devices. These other devices may include a Firewire bus, camera, global positioning system receiver, Bluetooth™ wireless device, PC Card device, and so forth.

Operative couplings, such as that between kernel 208, rendering module 210, fast awake module 110, and device drivers 212 are shown for emphasis. All devices in FIG. 2 are operatively coupled, with their respective arrows omitted only for clarity of illustration.

Illustrative Processes for Fast Awakening from a Low Power Mode

Figure 3:
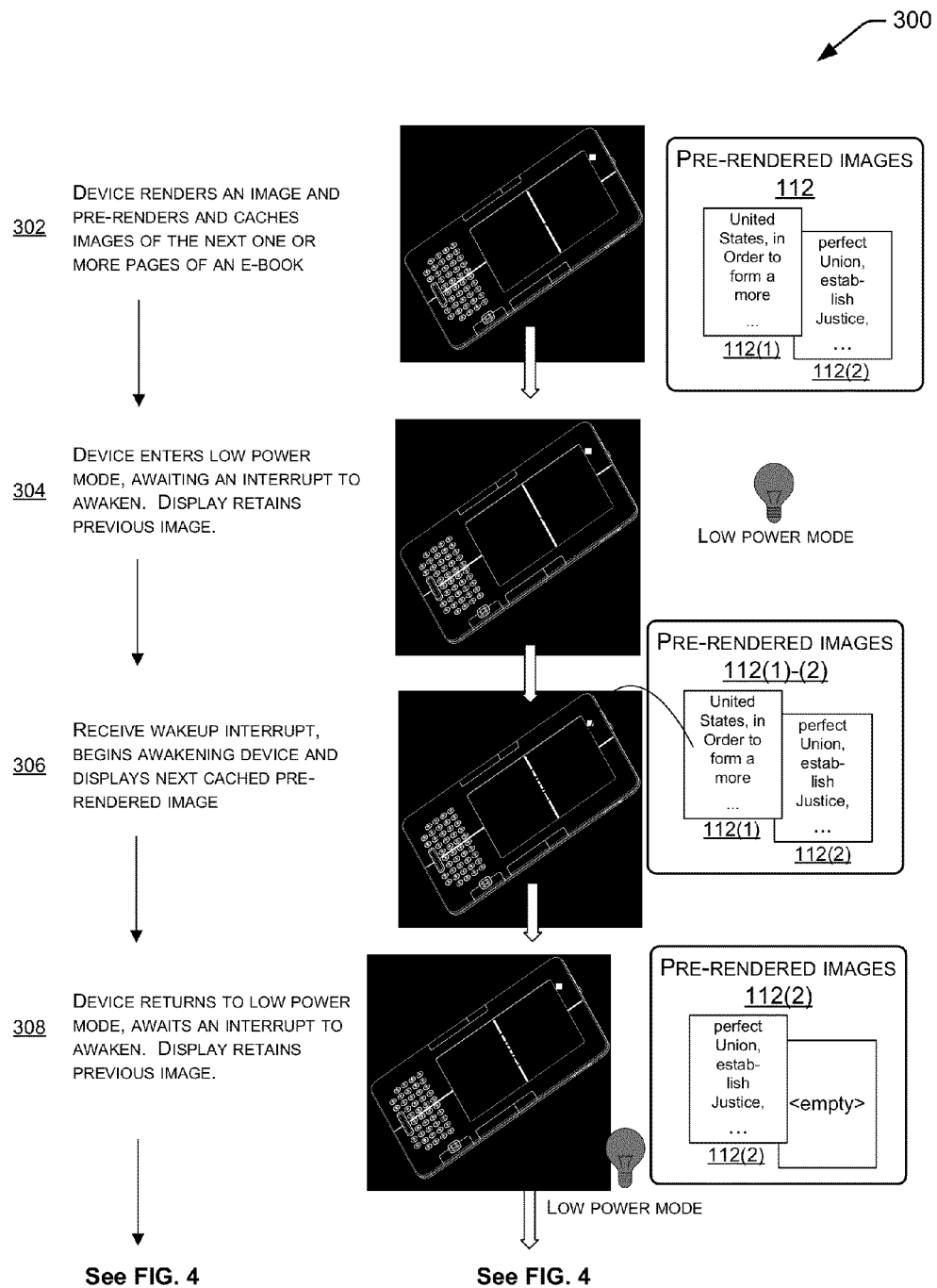
FIG. 3 is an illustrative process of pre-rendering images for presentation on a display, entering a low power mode, and using a fast awake module to present at least one of the pre-rendered images.

FIG. 3 is an illustrative process 300 of an electronic device, such as an eBook reader device, using a fast awake module to display a pre-rendered page. Operation 302 shows an eBook reader device 102 in an "awake" mode. That is, eBook reader device 102 is rendering an image for presentation on the display 104, as well as pre-rendering and caching images of the next one or more pages of an eBook. In this example, the device pre-renders and caches two pages, although other implementations may pre-render and cache any other number of pages stored in memory available on the eBook reader device 102. In this example, the eBook reader device is displaying content comprising the text of the Constitution of the United States. The display is currently presenting "We the People of the" The next two pages, pre-rendered and stored in a cache, comprise pre-rendered image 112(1) of the text "United States, in Order to form a more" and pre-rendered image 112(2) of the text "perfect Union, establish Justice,"

Operation 304 shows the eBook reader device 102 entering a low power mode. While in this low power mode power consumption is reduced. In some implementations, communication devices such as a wireless wide-area networking interface peripheral may be turned off or otherwise disabled while in the low power mode. Various low power modes may be used, including that which is discussed in pending U.S. patent application Ser. No. 12/261,980 filed Oct. 30, 2008 and entitled "Low Power Mode for Processor." For example, on the Freescale architecture, the low power modes many include a doze mode or a state retention mode. While in a low power mode, power consumption is reduced. This reduction in power consumption may be accomplished by shutting down unused hardware, reducing supply voltages, and so forth.

While in low power mode, the eBook reader device 102 may listen for the reception of an interrupt and, upon detecting that such an interrupt has been received, may fully or partially awaken from the low power mode. In some implementations, the interrupt may be initiated at a power management module. Furthermore, in some implementations interrupts other than the keypad wakeup interrupt may be disabled while in the low power mode. Awakening involves the at least partial resumption of operation by the device in excess of that present during a low power mode. These interrupts may be generated by several sources. For example, activation of a power switch may generate a power wakeup interrupt, while activation of a key on the keypad 220 may generate a keypad interrupt. In some implementations, the keypad 220 may comprise the page turn button 106 and keyboard 108, or other user actuable controls.

While in low power mode, the eBook reader device 102 continues to present the image on the display 104. Thus, the user may still continue to consume the content by, for example, reading the image of the text on the display 104 while the eBook reader device 102 is in a low power mode.

Operation 306 shows that after a user has finished reading the page the user activates one of the keys on the keypad, such as a page turn button 106. This activation triggers a keypad wakeup interrupt, which results in a call to the fast awake module 110. The eBook reader device 102 begins to awaken and a cached pre-rendered image, such as pre-rendered image 112(1) of the page "United States, in Order to form a more . . . ," is presented on the display 104.

A comparison between displaying a page when the device is awake against displaying a page using fast awake mode highlights advantages of the fast awake module 110. While the device 102 is awake and running, the keypad wakeup interrupt invokes the interrupt request (IRQ) handler of a keypad device driver. The keypad device driver determines the specific button which was pressed by looking up the keypad matrix and passing the event to a userspace keypad handler. The userspace keypad handler synchronizes with a userspace application to determine the next page. This next page may then be passed to the display driver. Completing this entire process after awakening takes time, and may result in delays of presentation to the user.

In contrast, the fast awake module reduces these delays. In one implementation, while the device is in a low power mode, the keypad device driver sends the keypad event to the userspace keypad handler, while also directly calling the display driver to present the cached page. The selection of which cached page to present may depend upon the keypad control which was actuated. For instance, user actuation of a forward page turn button would present a next cached page image. Thus, latency is reduced with the fast awake module 110 because the display driver need not wait for the page image to be produced from the userspace application.

Continuing the example, at least one pre-rendered image remains in the cache (specifically, pre-rendered image 112(2)) and, thus, operation 308 returns the eBook reader device 102 to a low power mode, again awaiting an interrupt to awaken. As described next with regards to FIG. 4 below, pre-rendering to refill the cache may take place prior to entering the low power mode.

Figure 4:
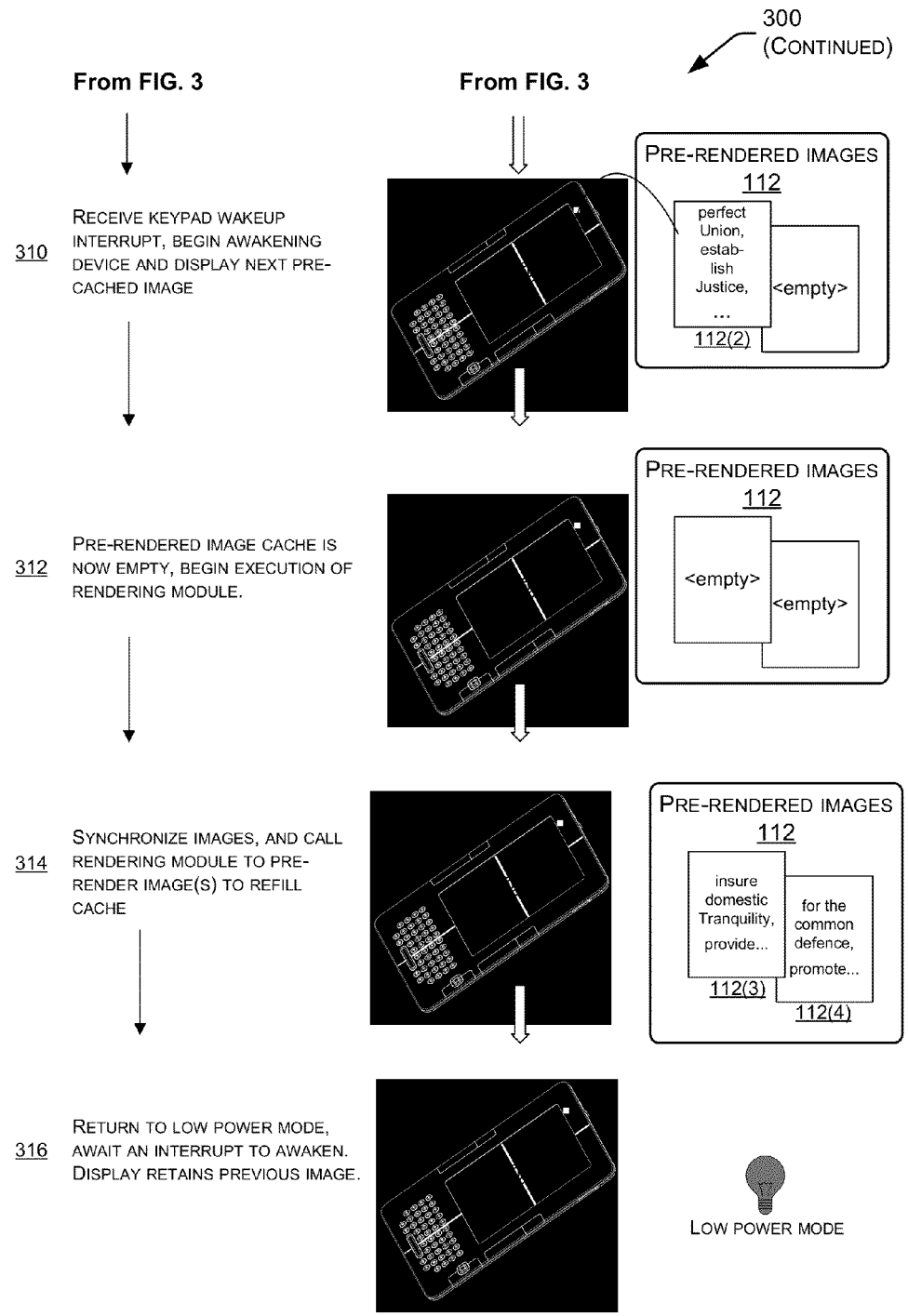
FIG. 4 continues the illustrative process of FIG. 3 to present a pre-rendered image on a display, and refilling a pre-rendering cache.

FIG. 4 continues the illustration of process 300 of using a fast awake module to display a pre-rendered page, and refilling the pre-rendering cache. Operation 310 shows eBook reader device 102 receiving a keypad wakeup interrupt, and initiating a fast awake module 110. As described above, the fast module 110 presents the next pre-rendered image on the display 104. Thus, as shown here, pre-rendered image 112(2) is presented on the display 104.

Operation 312 illustrates that the pre-rendered image cache is empty and, in response to making this determination, the rendering module 210 begins execution. As a result, the eBook reader device 102 remains in an active mode, rather than returning to the low power mode.

Operation 314 synchronizes the images presented with content yet to be presented, and the rendering module is called to pre-render images to refill the cache. The synchronization may comprise determining what image is presented on the display, and comparing this image to a next anticipated portion of the content to be displayed. For example, synchronization may indicate that page three of an eBook is presented, that forward motion through the eBook is anticipated, and the subsequent two pages are to be pre-rendered having the same amount of content as the currently rendered page. Thus, in this example the following pages are pre-rendered, resulting in pre-rendered image 112(3) showing "insure domestic Tranquility, provide . . . " and pre-rendered image 112(4) showing "for the common defence, promote . . . ."

Operation 316 shows eBook reader device 102 now having a full cache that includes pre-rendered images 112(3)-(4). This operation also illustrates that Book reader device 102 returns to the low power mode after filling the cache. As described above with reference to FIG. 3, the device may now listen for and await an interrupt in order to awaken and, upon receiving a keypad wakeup interrupt, may initiate the fast awake module.

Figure 5:
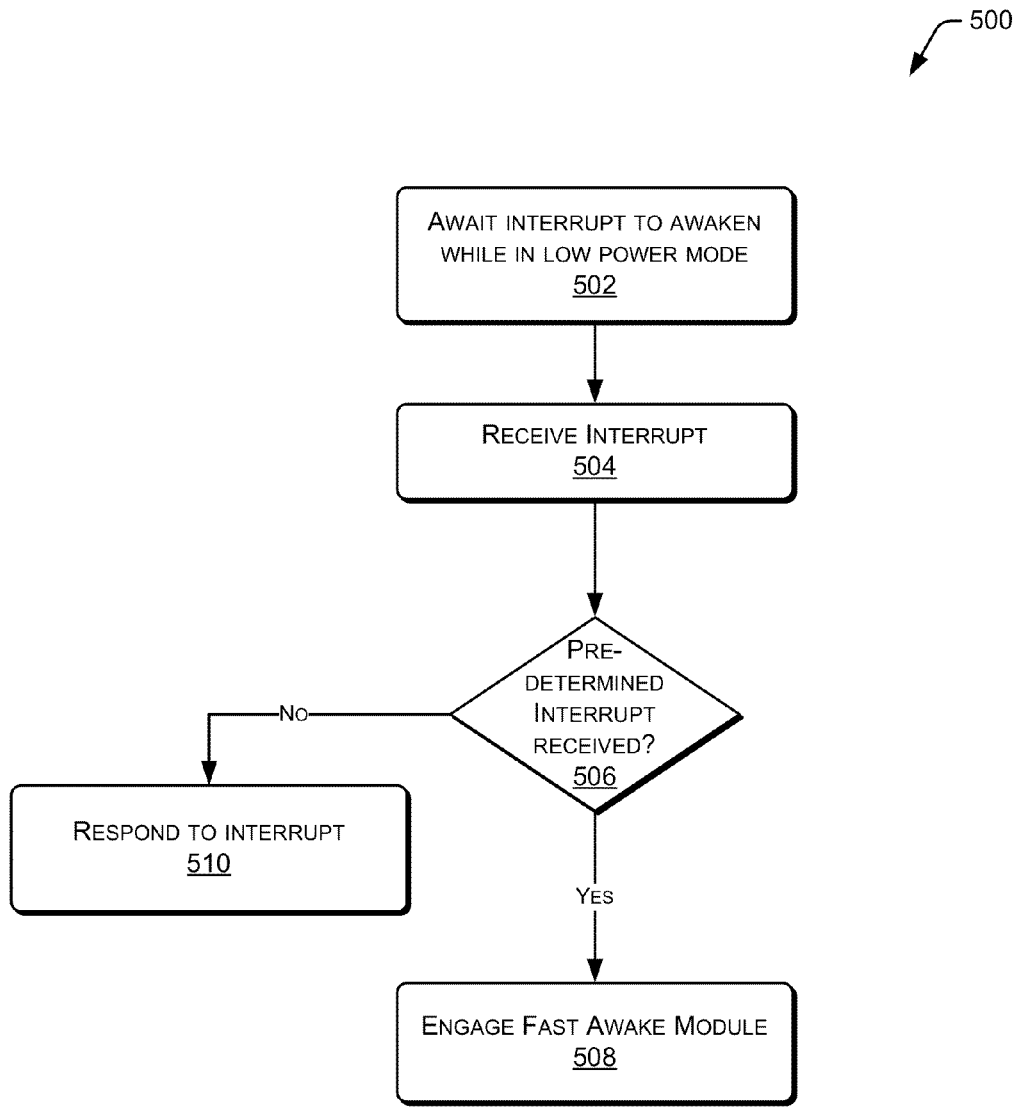
FIG. 5 is an illustrative flow diagram of a process for determining when to engage a fast awake module.
Figure 6:
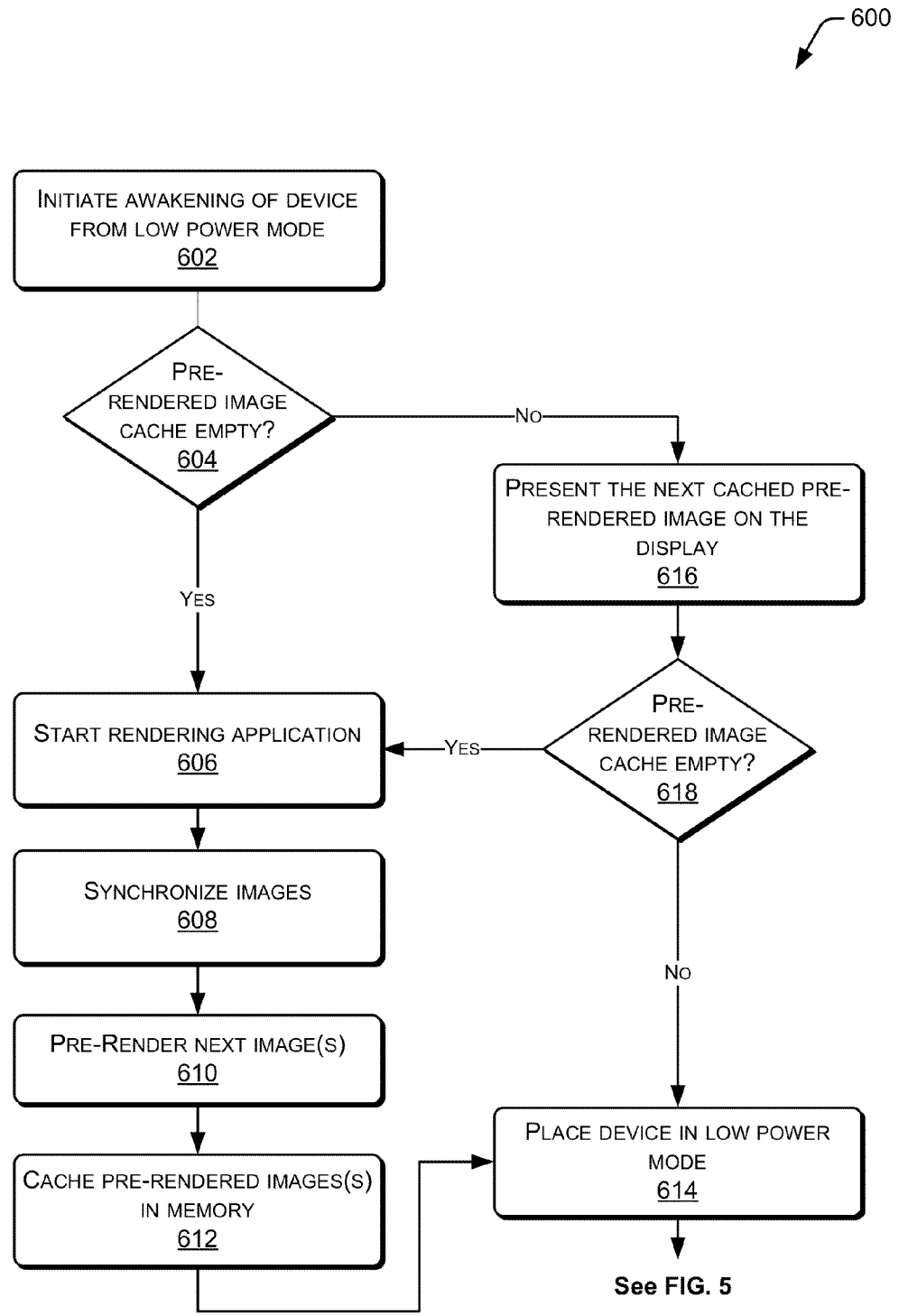
FIG. 6 is an illustrative flow diagram of a process for fast awakening an electronic device.
Figure 7:
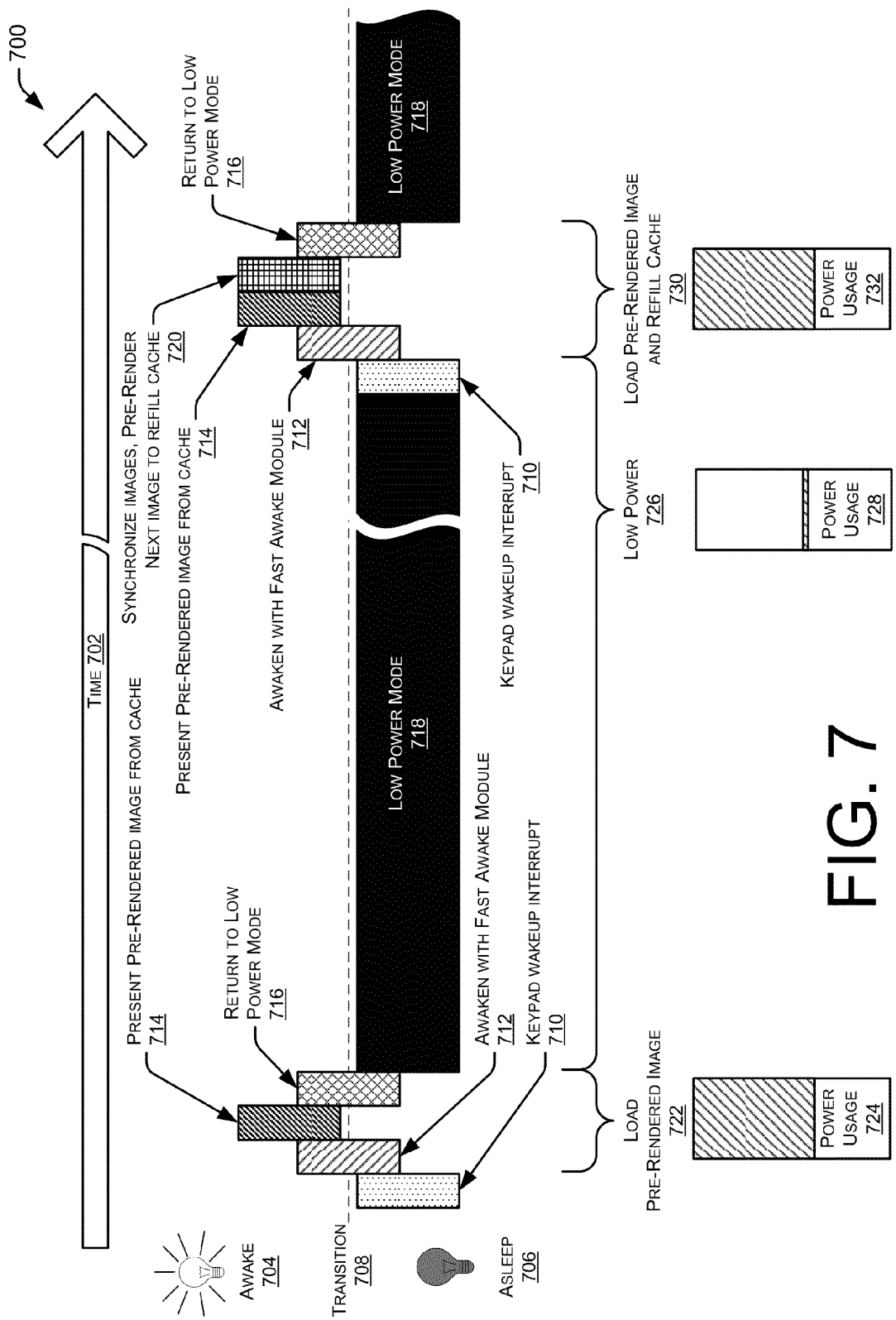
FIG. 7 is an illustration of transitions between awake mode and low power mode via fast awakening and relative power consumption of the device during these different modes.

FIGS. 5-7 illustrate example processes 500, 600, and 700 that may be implemented by the architecture of FIGS. 1-2 or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 5 is an illustrative flow diagram 500 of a process for determining when to engage a fast awake module 110. Fast awake capitalizes on the predictability of certain behaviors. For example, in an eBook reader device 102, it is reasonably anticipated that a likely action to occur is a page change. When a book is being displayed, it is furthermore quite likely that this is a page change to a following page, i.e., from page three to page four.

At 502, an eBook reader device 102 awaits an interrupt to awaken while in a low power mode. This low power mode may comprise gating processor clocks, placing memory into a self-refresh mode, discontinuing power to peripheral devices, and so forth. While in the low power mode, a portion of the eBook reader device 102, such as a power management module, remains active, at least at a low level. In some implementations the power management module may comprise a power management integrated circuit. This power management module may be configured to receive an interrupt, such as from activation of a power button or activation of a key on a keypad. These interrupts may vary according to their source. For example, an interrupt from the activation of the power button may be distinguishable from activation from activation of a key on a keypad.

At 504, an interrupt is received and, at 506, a determination is made as to whether the interrupt is a pre-determined interrupt configured to initiate the fast awake module. For example, the pre-determined interrupt may be the keypad wakeup interrupt, although the pre-determined interrupt may comprise another type of interrupt in other implementations.

When the determination at 506 indicates the pre-determined interrupt, such as the keypad wakeup interrupt, is received, the fast awake module 110 is engaged at 508. The process initiated by the fast awake module 110 is described in more detail below with regards to FIG. 6.

Returning to 506, when the determination is that the interrupt receives it not the pre-determined interrupt, whatever action has previously been defined as being associated with that interrupt may take place. To continue our example, if the interrupt is the power wakeup interrupt rather than the keypad wakeup interrupt, the device would not engage the fast awake module 110 but would instead power on other components of the device.

FIG. 6 is an illustrative flow diagram of a process 600 for fast awakening, which may be implemented by a fast awake module 110. At 602, the awakening of an eBook reader device 102 from the low power mode has been initiated. As described above with respect to FIG. 5, this may result from receipt of the pre-determined interrupt.

At 604, a determination is made as to whether a pre-rendered image cache is empty. When the pre-rendered image cache is empty, a rendering module 210 may be executed by the processor 202 at 606. This rendering module 210 as described above generates images suitable for presentation on the display 218 from content.

At 608, the rendering module 210 may synchronize content presented on display 218 with pre-rendered images 112(1)-(P) in the cache, as well as with the next anticipated images for pre-rendering. For example, in instances when the cache stores two pre-rendered images, the rendering module 210 would be synchronized to pre-render subsequent pages which have not yet been presented after both images in the cache have been presented.

At 610, the rendering module 210 pre-renders the anticipated image or images. The number of images pre-rendered may vary according to one or more conditions. These conditions may comprise available cache storage space, a size of the pre-rendered images, a pre-determined threshold of maximum images to cache, a pre-determined threshold of minimum images to cache, and so forth.

At 612, the pre-rendered images are cached, or stored for later use, in memory. As described above, this may be in memory 204, dedicated graphics memory, external memory 226, and so forth.

At 614, the eBook reader device 102 may be placed into a low power mode. Upon returning to the low power mode, the electronic device may then await an interrupt to awaken, as described above with respect to FIG. 5. In some implementations, a determination may be made as to whether to return immediately to low power mode as shown here, or to wait for a pre-determined interval to expire or condition to be met. For example, it may be desirable to keep the eBook reader device 102 awake when the user chooses to go back one page in an eBook. This action of changing how the content is accessed may be used to infer that the user of the eBook reader device 102 is looking up a specific passage, rather than reading in a linear fashion. Thus the faster response time of keeping the eBook reader device 102 in an active mode may be desired.

Returning to determination 604, when the pre-rendered image cache is not empty, the next cached pre-rendered image 112 is presented on the display at 616. Such presentation may occur rapidly. For example, in one implementation of an eBook reader device, the kernel and drivers may awaken within about 200 milliseconds (ms), with a worst case of about 500 ms. Thus, the next page is displayed to the user within, at most about 500 ms of receiving the interrupt.

In contrast, when the pre-rendered image 112 is not available and rendering needs to take place, the entire application stack and associated libraries, drivers, and so forth, must be executed to prepare the rendering module 210 for action. Then the rendering itself must take place, introducing further delays.

Thus, by caching a pre-rendered image 112, and presenting the pre-rendered image 112 upon receiving a specified interrupt, the time to present content is significantly reduced while taking significant advantage of the power savings provided by the low power mode.

At 618, after presenting the cached pre-rendered next image on the display, a determination is made as to whether the pre-rendered image cache is empty. For example, the presentation of 616 above may have exhausted the cache.

When, at 618, the pre-rendered image cache is empty, the process may continue to 606. As described above, the rendering application is executed to pre-render images to fill the cache at 606.

When the pre-rendered image cache is not empty, the process may continue to 614, wherein the process places the device in the low power mode. This delays rendering until a future time, when the cache has been exhausted. This proves beneficial when it is more power efficient to render multiple images in a batch. Furthermore, delaying the rendering until a cache refill is called for further minimizes the time the eBook reader device 102 is required to remain awake. In other implementations, pre-rendering may take place after each awakening.

FIG. 7 is an illustration 700 of transitions over time between awake mode and low power mode via fast awakening. Also shown are relative instantaneous power consumption figures for these modes.

In this illustration, time is indicated by arrow 702, with time increasing from left to right on the page as shown. For simplicity of illustration and not by way of limitation, the eBook reader device 102 may be considered to have two power states: awake 704 and asleep 706. These two states are shown divided by broken line 708 indicating where a transition from one state to the other occurs.

At 710, eBook reader device 102 is asleep 706 and receives a keypad wakeup interrupt. As described above with respect to FIG. 5, this keypad wakeup interrupt triggers the fast awake module 110. At 712, the eBook reader device 102 transitions from asleep 706 to awake 704 using the fast awake module 110.

At 714, the electronic device is awake 704 and the fast awake module 110 presents on a display a pre-rendered image that has been stored in a cache. Assuming the cache still contains pre-rendered images, at 716 the eBook reader device 102 transitions to being asleep 706, thus consuming less power than when awake. While a single low power mode is shown, in some implementations there may be a plurality of low power modes, including stepped low power modes.

Low power mode 718 may persist for an extended period of time. For example, this may occur while a user reads an image, such as a page of text, as presented on the display. Eventually, the user presses a key, generating another keypad wakeup interrupt 710. As before, this calls fast awake module at 712 to transition from asleep 706 to awake 704. Again, at 714 the pre-rendered image from the cache is presented on the display. However, assume in this example that the cache has been exhausted.

When the cache has been exhausted, the eBook reader device 102 may remain awake 704, and refill the cache, as described above with respect to FIG. 6. Thus, as shown at 720, synchronization of the images and pre-rendering to refill the cache takes place. Once the refilling of the cache is complete, the eBook reader device 102 may once again transition from awake 704 to asleep 706 and may resume the low power mode 718.

Also shown in FIG. 7 are several time intervals for discussion. At 722 the time interval necessary to load the pre-rendered image is shown. As described above, in some implementations a time from receipt of interrupt to kernel and driver wakeup is about 200 ms, with a worst case scenario of about 500 ms. During this time, as shown by graph 724, full power usage takes place. For example, an exemplary eBook reader device may require 18 milliamperes (mA) of current while awake 704.

At 726, a time interval while at low power is shown. For example, in an example eBook reader device, time interval 726 may encompass a user taking 60 seconds to read an image of a page presented on the display. During this time, as shown in graph 728, power usage is significantly reduced. For example, an exemplary eBook reader device may require only 0.67 mA while in low power mode 718.

At 730, a time interval showing awakening 712, presentation of the pre-rendered image 714, and the additional steps of refilling the cache 720 are shown. Note that interval 730 is greater than 722, due to the additional time necessary to refill the cache. As with 722, as shown by graph 732, power usage is again at maximum while the eBook reader device 102 is awake 704.

The amount of time spent in low power mode 718 may be under-represented by this simplified illustration in some instances. For example, assume an eBook reader device is in use. A user may trigger a page change in an eBook once every 56 seconds. Thus, the low power interval 726 may be about 56 seconds. The time interval 722 to load the pre-rendered image may be approximately 1 second. The time interval 730 to load the pre-rendered image and refill the cache may be greater, assume about 3 seconds. Thus, in this example, the electronic device is awake for only 4 seconds out of every 60. Furthermore, rendering time does not scale linearly with the size of the display. Thus, an electronic device with a larger display may spend an even larger time interval 726 in low power mode, while the user reads the additional text which is presented.

Source code in assembly language and the C language for one implementation of fast awake is presented below. This code is provided as an example, not as a limitation.

Example Code 1

```
/* 1) Main suspend code is in arch/arm/mach-mx35/pm.c: */
    /* Executing CP15 (Wait-for-Interrupt) Instruction */
    cpu_do_idle ( ) ;
/* 2) The cpu_do_idle( ) puts the CPU into sleep mode: */
/*
 * cpu_v6_do_idle( )
 *
 * Idle the processor (eg, wait for interrupt).
 *
 * IRQs are already disabled.
 */
ENTRY(cpu_v6_do_idle)
    mrc p15, 0, r0, c1, c0, 0   @Read system control reg
    bic r0, r0, #0x00001000     @Disable I-cache
    bic r0, r0, #0x00000004     @Disable D-cache
    mcr p15, 0, r0, c1, c0, 0   @Update system control reg
    mov r0, #0                  @Invalidate entire I-cache (also
    mcr p15, 0, r0, c7, c5, 0   @flushes branch target cache)
    mov r0, #0                  @Clean and invalidate entire
    mcr p15, 0, r0, c7, c14, 0  @D-cache
    mov r0, #0
    mcr p15, 0, r0, c7, c0, 4   @Enter WFI
```

-continued

```
    mrc p15, 0, r0, c1, c0, 0 @Read system
control reg
    orr r0, r0, #0x00001000 @Enable I-
cache
    orr r0, r0, #0x00000004 @Enable D-
cache
    mcr p15, 0, r0, c1, c0, 0 @Update
system control reg
    mov pc, lr
/* 3) The keypad driver suspends prior to this: */
static int mxc_kpp_suspend(struct platform_device
*pdev, pm_message_t state)
{
    unsigned short reg_val;
    /*
     * NOTE: In some implementations, may go to
     * the "locked" state before going to
suspend; therefore, all
     * keyboard locking actions are in the
lock_keypad function, above.
     */
    if (device_may_wakeup (&pdev->dev)) {
        reg_val = __raw_readw(KPSR);
        if ((reg_val & KBD_STAT_KDIE) == 0) {
            /* if no depress interrupt
enable the release interrupt */
            reg_val |= KBD_STAT_KRIE;
            __raw_writew(reg_val, KPSR);
        }
        enable_irq_wake(keypad->irq);
    }
    return 0;
}
/* Prior to suspending, may check if the keypad is a
wakeup source:
"if (device_may_wakeup(&pdev->dev)) {"
If yes, then it enables it as a wakeup source:
"enable_irq_wake(keypad->irq);"
4) We set the keypad as the wakeup source in the
keypad initialization, this is done using:
"device_init_wakeup(&pdev->dev, 0);"
5) Once the device resumes, we disable the IRQ as
the wakeup source as it is unneeded:
        if (device_may_wakeup(&pdev->dev)) {
            /* the irq routine already cleared
KRIE if it was set */
            disable_irq_wake(keypad->irq);
        }
*/
/* 6) The wakeup may be configured in the MX35
AVIC. */
```

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method comprising:
receiving a keypad wakeup interrupt at an electronic device;
awakening the electronic device from a low power mode at least partly in response to the receiving of the keypad wakeup interrupt;
when a pre-rendered image cache of the electronic device does not store a pre-rendered image:
starting a rendering application;
synchronizing a presented image on a display with content to be presented;
pre-rendering an image of the content to be presented;
storing the pre-rendered image in the pre-rendered image cache;
placing the electronic device into the low power mode;
when the pre-rendered image cache of the electronic device does store a pre-rendered image:
presenting the stored pre-rendered image on the display;
when the pre-rendered image cache is empty after presentation of the stored pre-rendered image:
starting the rendering application;
synchronizing the presented image on the display with content to be presented;
pre-rendering an image of the content to be presented;
storing the pre-rendered image in the pre-rendered image cache;
placing the electronic device into the low power mode; and
when the pre-rendered image cache is not empty after presentation of the stored pre-rendered image:
placing the electronic device into the low power mode.

2. The method of claim 1, wherein the image comprises a representation of content of an electronic book and the pre-rendered image is content following the presented content.

3. The method of claim 1, wherein a plurality of images are pre-rendered and stored in the pre-rendered image cache of the electronic device.

4. The method of claim 1, wherein the display continues to present the stored pre-rendered image without power when the electronic device is in the low power mode.

5. A method comprising:
receiving an interrupt on an electronic device that is in a current instance of a low power mode;
initiating an awakening of the electronic device from the current instance of the low power mode at least partly in response to the receiving of the interrupt;
presenting, on a display of the electronic device, an image that has been pre-rendered and stored in a cache of the electronic device prior to the electronic device entering the current instance of the low power mode, the pre-rendered image being rendered prior to the electronic device being placed into the current instance of the low power mode during which the interrupt is received, the pre-rendered image being different from another image presented on the display when the electronic device is placed into the current instance of the low power mode; and
placing the electronic device into another instance of the low power mode after the presenting of the image on the display.

6. The method of claim 5, wherein the received interrupt comprises an indication that a user has activated a control on a touch screen of the electronic device.

7. The method of claim 5, wherein the received interrupt comprises an indication that a user has activated a control on a keypad of the electronic device.

8. The method of claim 5, further comprising:
starting a rendering application of the electronic device;
synchronizing a currently presented image with content to be presented;
pre-rendering an image of content to be presented; and
storing the pre-rendered image of the content to be presented on the cache of the electronic device.

9. The method of claim 5, wherein the low power mode comprises gating one or more clocks associated with a central processor unit of the electronic device.

10. The method of claim 5, wherein the presenting of the cached, pre-rendered image on the display is substantially completed within 500 milliseconds of the receiving of the interrupt.

11. The method of claim 5, wherein the pre-rendered image is cached within dedicated graphic memory.

12. An electronic device comprising:
 a central processor unit;
 memory coupled to the central processor unit;
 a pre-rendered image that has been rendered and stored in the memory and generated at least in part upon direction of the central processor unit prior to the electronic device entering a current instance of a low power mode;
 a display device coupled to the memory; and
 a fast awake module stored in the memory and configured to execute on the central processor unit to:
 receive an interrupt on the electronic device while the electronic device is in the current instance of the low power mode, the pre-rendered image being rendered prior to the electronic device being placed into the current instance of the low power mode during which the interrupt is received, the pre-rendered image being different from another image presented on the display device when the electronic device is placed into the current instance of the low power mode;
 present the pre-rendered image rendered prior to the electronic device entering the current instance of the low power mode on the display device; and
 place the electronic device into another instance of the low power mode after the presenting of the pre-rendered image on the display device.

13. The electronic device of claim 12, wherein the pre-rendered image is cached in dedicated graphic memory.

14. The electronic device of claim 12, wherein the fast awake module is further configured to:
 initiate awakening of the electronic device from the current instance of the low power mode at least partly in response to the receiving of the interrupt;
 start a rendering application of the electronic device;
 pre-render an image of content expected to be presented; and
 store the pre-rendered image in the memory.

15. The electronic device of claim 14, wherein the fast awake module is further configured to synchronize a currently presented image with content selected for presentation.

16. The electronic device of claim 12, wherein the low power mode comprises a mode in which the electronic device consumes less power than compared to power consumed by the electronic device while in an awake mode resulting at least partially from gating one or more logic circuits, reducing supply voltages, or both.

17. One or more non-transitory computer-readable storage media storing instructions that, when executed by one or more processors, cause the one or more processors to perform acts comprising:
 receiving, on an electronic device having a display and a cache that stores a pre-rendered image rendered prior to the electronic device entering a current instance of a low power mode, an interrupt assigned to initiate awakening of the electronic device;
 awakening, at least partially, the electronic device from the current instance of the low power mode at least partly in response to the receiving of the interrupt;
 presenting on the display the pre-rendered image stored in the pre-rendered image cache, the pre-rendered image being rendered and stored in the pre-rendered image cache prior to the electronic device being placed into the current instance of the low power mode during which the interrupt is received, the pre-rendered image being different from another image presented on the display when the electronic device is placed into the current instance of the low power mode; and
 resuming the low power mode in another instance of the low power mode after the presenting of the pre-rendered image on the display.

18. The one or more non-transitory computer-readable media of claim 17, further comprising, before the resuming of the low power mode:
 when the cache does not store at least one other pre-rendered image:
 accessing a rendering application of the electronic device;
 pre-rendering an image of content to be presented; and
 storing the pre-rendered image of the content to be presented in the cache of the electronic device.

19. The one or more non-transitory computer-readable media of claim 18, further comprising synchronizing a presented image with content to be pre-rendered before the resuming of the low power mode and when the cache does not store at least one other pre-rendered image.

20. The one or more non-transitory computer-readable media of claim 17, wherein the low power mode comprises a mode in which the electronic device consumes less power than compared to power consumed by the electronic device while in an awake mode resulting at least partially from gating one or more logic circuits, reducing supply voltages, or both.

* * * * *